C. I. HALL.
DEMAND LIMITING APPARATUS.
APPLICATION FILED APR. 26, 1916.
1,267,213.
Patented May 21, 1918.
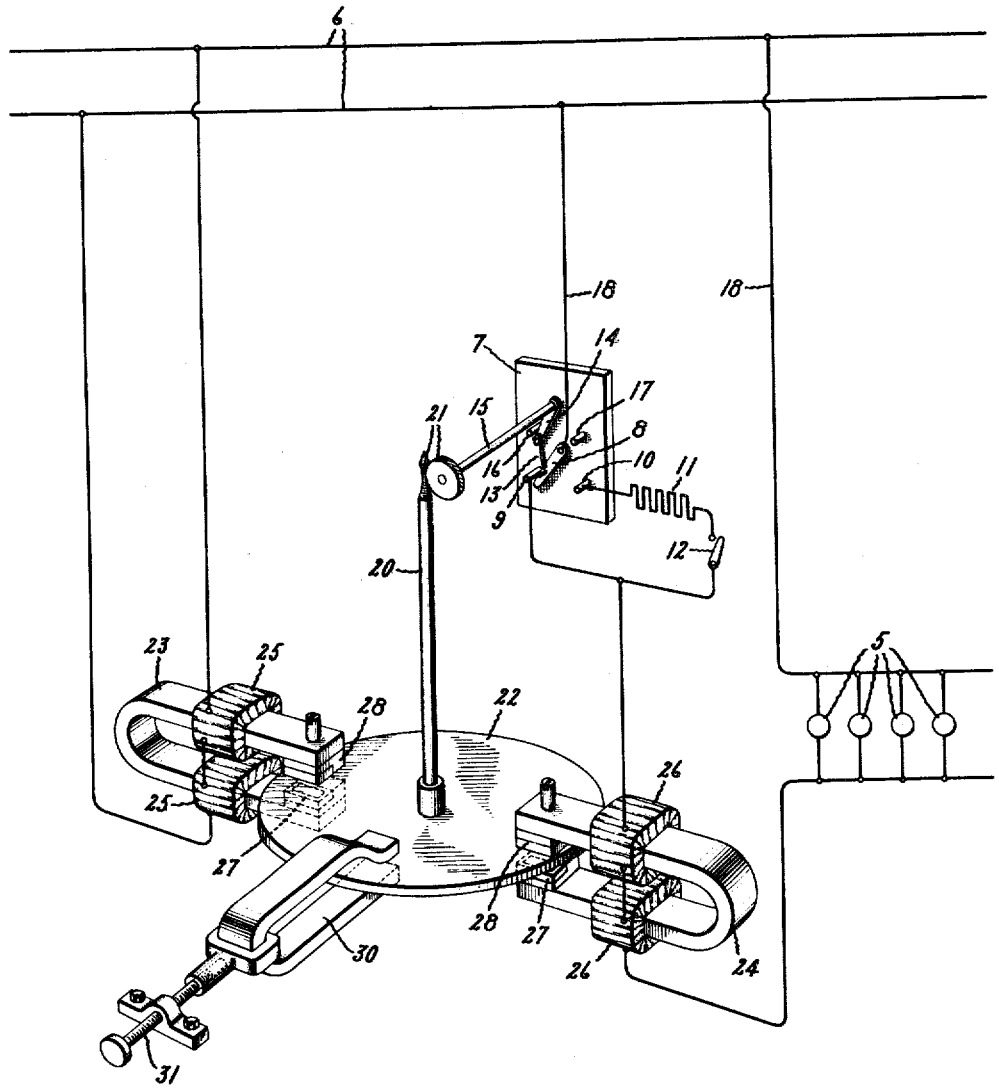
Inventor:
Chester I. Hall,
by
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

DEMAND-LIMITING APPARATUS.

1,267,213.  Specification of Letters Patent.  Patented May 21, 1918.

Application filed April 26, 1916. Serial No. 93,788.

*To all whom it may concern:*

Be it known that I, CHESTER I. HALL, a citizen of the United States, residing at Fort Wayne, county of Allen, State of Indiana, have invented certain new and useful Improvements in Demand-Limiting Apparatus, of which the following is a specification.

My invention relates to demand limiting apparatus, and in particular to apparatus for limiting the demand of an electrical installation. The object of the invention is to provide a novel and improved demand limiting device. More particularly the object of the invention is to provide a demand limiting device which will interrupt or modify the current flow in an electric circuit, upon the occurrence of an excess demand therein, in a time interval varying as an inverse function of the magnitude of the excess demand and will then reëstablish the normal circuit conditions in a substantially definite time interval. In its complete form my improved demand limiting device comprises a circuit-controlling means having a circuit-closing position and a circuit-modifying position in combination with means responsive to an excess of demand for effecting the operation of the circuit-controlling means to its circuit-modifying position in a time varying inversely with such excess and for restoring the circuit-controlling means to its normal circuit-closing position in a definite time interval after such operation.

Demand limiting devices for interrupting or modifying the current flow in an electric circuit upon the occurrence of an excess demand are well known. Such devices are employed in installations where it is desired to limit the rate of energy consumption. The maximum rate of energy consumption or maximum demand is predetermined by contract, or otherwise, and the function of the demand limiting device is to keep the demand below its predetermined value by interrupting or suitably modifying the supply of electric energy when the demand exceeds the predetermined value. Thus, the consumer can take energy as he pleases as long as his demand does not exceed the contract value, but as soon as an excess demand occurs the supply of energy is rendered so unsatisfactory by the demand limiting device that the consumer is compelled to restrict his demand until it is within the predetermined value. As far as I am aware, demand limiting devices have heretofore been generally constructed to operate instantaneously, that is, within a few seconds of the time the maximum predetermined current is exceeded. Such instantaneous operation is, however, undesirable, and various means, such as dash pots, etc., have been employed to make the circuit-modifying operation slow acting, so that short-circuits or heavy currents which remain on only for a short time will have no effect. In many instances it is not objectionable to permit a consumer's demand to exceed its maximum contract value for a short time interval, and frequently it is particularly advantageous to the consumer to be able to slightly exceed his contract demand for a brief time. The demand limiting device of my present invention is particularly adapted for such cases, and has a time lag of operation dependent upon the excess demand, and this time lag may be set for any desired interval, such for example, as from one minute to one hour.

The construction and mode of operation of the improved demand limiter of my present invention will be best understood by reference to the accompanying drawings, in which the figure diagrammatically illustrates a demand limiting device embodying the invention.

In the accompanying drawing, the demand limiting device is operatively associated with an electrical installation comprising the translating devices 5. The translating devices 5 are adapted to receive electric energy from suitable power mains 6, and the function of the demand limiting device is to suitably modify the supply of electric energy to the translating devices 5 when the rate of consumption of energy in these devices exceeds a predetermined value for a substantial time interval, the length of which in accordance with my present invention varies as an inverse function of the magnitude of the excess demand. A circuit-controlling means 7 is connected in series with the translating devices 5. The circuit-controlling means comprises a movable switch arm 8 adapted to engage with either of two fixed contacts 9 and 10. When the switch arm 8 engages with contact 9, the circuit of the supply conductors 18 of the translating devices 5 is closed, and this circuit-closing position of the switch arm 8 is its normal position. On the other hand when the switch arm 8 is in engagement with the contact 10, suitable current-modifying means are included in the supply conductors 18 of the translating devices 5. For example, a resistance 11 may be included in the supply conductors for suitably decreasing the current flow in the installation. The value of the resistance 11 may be determined as desired, and in the limiting case may be infinitely large, thus amounting in effect to an open circuit, with a resulting complete interruption of the flow of electric energy to the translating devices 5 when the switch arm 8 engages the circuit-modifying contact 10. A switch 12 is shown in the drawing in series with the resistance 11, and with this switch in its open position the flow of current to the translating devices 5 will be completely interrupted when the circuit-controlling means occupies its circuit-modifying position.

The switch arm 8 is connected by a spring 13 to a movable link 14. The link 14 is adapted to be moved by a rotatably mounted shaft 15. Movement of the link 14 is limited in either direction by the fixed stops 16 and 17. The movable link 14, the spring 13, and the switch arm 8 thus constitute in effect a toggle-joint switch. Movement of the movable link 14 a predetermined distance to either side of the mid-point between the fixed stops 16 and 17 will throw the switch arm 8 with a quick snap action into one or the other of its circuit-controlling positions.

The rotatably mounted shaft 15 is adapted to be driven by a rotatable shaft 20 through suitable gearing 21. A disk armature member 22 of conducting material is secured to the shaft 20 and is adapted to rotate in the air gaps of two U-shaped shaded-pole magnets 23 and 24. Shunt energizing coils 25 are suitably mounted on the magnetic core of the magnet 23 and are connected across the supply mains 6. Series energizing coils 26 are mounted on the magnetic core of the magnet 24 and are connected in series with the translating devices 5 and with the circuit-controlling means 7. The magnets 23 and 24 each have a fixed shading-pole 27 and an adjustable shading-pole 28. The magnets 23 and 24 are thus in effect shaded-pole induction motors, and their shading-poles are so arranged that the torques of the two magnets tend to rotate the armature disk 22 in opposite directions. The disk armature 22 is furthermore adapted to rotate between the poles of a permanent damping magnet 30. The damping action of the magnet 30 can be adjusted by means of the screw-threaded bolt 31, as will be clearly understood from the drawing.

The shunt shaded-pole magnet 23 develops a definite constant torque tending to rotate the disk armature 22 in such a direction as to move the link 14 toward the stop 16. The stop 16 limits the movement of the link 17 in this direction and thus determines or fixes the initial position of the armature disk 22. The series shaded-pole magnet 24 develops a torque tending to rotate the disk armature 22 in such a direction as to move the link 14 toward the fixed stop 17. We may thus consider the torque of the series magnet 24 as a forward or direct-acting torque, and the torque of the shunt magnet 23 as a backward-acting or countertorque. When the demand of the installation comprising the translating devices 5 is just equal to the predetermined contract demand the torque of the series magnet 24 will be just equal to the torque of the shunt magnet 23. As long as the demand of the translating devices is below this predetermined maximum value, the countertorque of the shunt magnet 23 will exceed and dominate the direct torque of the series magnet 24, and the link 14 will be held against the fixed stop 16 by this dominating torque of the shunt magnet. Just as soon as the demand of the translating devices 5 exceeds the predetermined contract value the direct-acting torque of the series magnet 24 will exceed the countertorque of the shunt magnet 23, and the disk armature 22 then begins to rotate forwardly and the link 14 will thereby be moved away from the stop 16 toward the stop 17. The rate of rotation of the disk armature 22 will depend upon the magnitude of the excess demand of the translating devices 5 and will vary as an inverse function of the magnitude of such demand. That is to say, the greater the excess demand the faster will the disk armature 22 rotate. When the link 14 has been driven by the disk armature 22 a certain distance beyond the mid-point between the stops 16 and 17, the switch arm 8 will be thrown into engagement with the circuit-modifying contact 10, and the consumer will be thus warned, by the total interruption of his energy supply or by a suitable modification thereof, of the existence of an excess demand, and will be obliged to decrease his demand to its proper value before the supply of energy to the translating devices 5 again becomes satisfactory. Just as soon as the switch arm 8 is thrown into engagement with the circuit-modifying contact 10 the current flow through the series coils 26 is so diminished that the torque of the shunt magnet 23 exceeds the torque of the series magnet 24 and the disk armature thus immediately begins to rotate in a backward direction. The link 14 thus starts to move toward the fixed stop 16 and after a definite interval of time the switch arm 8 is thrown to its normal position in engagement with the circuit-closing contact 9. It will thus be seen that after the occurrence of any excess demand the circuit-controlling means will be moved to its circuit-modifying position in a time interval varying inversely as the magnitude of such excess demand, and thereupon the normal circuit-closing condition will be reëstablished in a substantially definite time interval. If at any time while the disk 22 is being rotated by a preponderating torque of the series magnet 24 the demand of the translating devices 5 should decrease to a value below the predetermined contract value the torque of the shunt magnet 23 will become dominating and the disk 22 will begin to rotate slowly in the opposite direction and will return to its initial position if the demand remains below its predetermined maximum value for a sufficient length of time.

My improved demand limiter operates to modify the circuit conditions of an electrical installation only after a certain predetermined and adjustable number of ampere hours of electric energy have been consumed at a rate greater than the predetermined contract rate, and the limiter is automatically reset in a much shorter length of time. Since the limiter operates only after a definite number of ampere hours of electric energy have been consumed with a demand in excess of the predetermined contract value, it will be obvious that the greater the excess demand the quicker will this definite number of ampere hours of energy be consumed, which is another way of describing the inverse time principle of the limiter. My improved demand limiter, accordingly, not only embodies the idea of a time interval imposed between the occurrence of an excess demand and the modifying of the circuit conditions, but in addition involves the idea of a time interval which varies inversely as the excess demand, thereby taking account of the length of time of a sustained excessive demand.

Adjustment of the ratio of the gearing 21 serves to vary the time interval of operation of my improved demand limiting device over any desired range. Thus, the time interval of operation of the device can be lengthened by an increase of the gear ratio between the disk armature 22 and the shaft 15, whereby the disk armature will have to make a proportionately greater number of revolutions at the same rate of speed before the switch arm 8 is thrown to its circuit-modifying position. The speed of rotation of the disk armature 22 can itself be varied by adjusting the position of the permanent damping magnet 30 with respect to the disk armature. Thus, the speed of the disk armature will be diminished for any particular excess demand by increasing the distance between the poles of the magnet 30 and the axis of rotation of the disk armature, and thereby the time interval of operation of the device will be lengthened. It will furthermore be obvious that the speed of rotation of the disk armature 22 may be varied by a change in the number of turns of the series coils 26, or by adjustment of the relative lever arms at which the shunt and series magnets act upon the disk armature. It will of course be understood that the permanent magnet 30 may if desired be omitted, since the electromagnetic drag of the motive magnets 23 and 24 will serve to damp the rotation of the disk armature. The magnet 30, is however, a very desirable element of the device, since it not only serves as a means of adjusting the time interval of operation of the circuit-controlling means after the occurrence of an excess demand, but also serves to adjust the length of the definite time interval before the normal circuit-closing condition of the circuit-controlling means is reëstablished after its operation to its circuit-modifying condition. The time interval of operation of the device can further be varied by moving the shading-poles 28 of the magnets 23 and 24 to positions in which the ratio of torque to electromagnetic drag is varied. Movement of the poles 28 also serves to adjust the relative torques of the two magnets 23 and 24 for any particular current condition. Thus the predetermined maximum demand at which the disk armature 22 begins to rotate can be adjusted by means of the adjustable shading-poles 28.

I have herein shown and particularly described a certain embodiment of my invention for the purpose of explaining its principle, but numerous modifications will present themselves to those skilled in the art. I, therefore, wish to cover by the following claim all modifications within the spirit of the invention.

What I claim as new, and desire to secure by Letters Patent of the United States, is:—

The combination with an electrical installation, of a demand limiting device comprising a movable member having an initial position, means for moving said member at a rate which is a measure of the demand of the installation in excess of a predetermined value whenever and during such times as the demand of the installation exceeds such predetermined value, and for returning said member to or maintaining said member in its initial position whenever and during such times as the demand of the installation is less than such predetermined value, circuit-controlling means electrically associated with such installation and having circuit-closing and circuit-modifying positions, and means operatively connecting said movable member to said circuit-controlling means so that the circuit-controlling means occupies its circuit-closing position when the member is in its initial position and is moved to its circuit-modifying position by a predetermined movement of the member.

In witness whereof, I have hereunto set my hand this 24th day of April, 1916.

CHESTER I. HALL.